(12) United States Patent
Ohara

(10) Patent No.: US 7,567,358 B2
(45) Date of Patent: Jul. 28, 2009

(54) IMAGE READING DEVICE FOR TRANSMITTING IMAGE DATA TO TERMINAL DEVICE

(75) Inventor: Kiyotaka Ohara, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 1094 days.

(21) Appl. No.: 10/669,877

(22) Filed: Sep. 25, 2003

(65) Prior Publication Data

US 2004/0061905 A1    Apr. 1, 2004

(30) Foreign Application Priority Data

Sep. 25, 2002    (JP)    ............... 2002-278925

(51) Int. Cl.
G06F 15/00    (2006.01)
G06F 3/12    (2006.01)
G06K 1/00    (2006.01)

(52) U.S. Cl. .................... 358/1.15; 358/1.13

(58) Field of Classification Search ......... 358/400–498, 358/1.1, 1.15
See application file for complete search history.

(56) References Cited

U.S. PATENT DOCUMENTS 5,911,044 A    6/1999    Lo et al.
6,256,662 B1    7/2001    Lo et al.
6,334,148 B1 *    12/2001    Sandstrom et al. .......... 709/219
6,429,952 B1 *    8/2002    Olbricht ...................... 358/442
6,958,832 B1 *    10/2005    Murata ........................ 358/474
2001/0014908 A1    8/2001    Lo et al.
2002/0004802 A1    1/2002    Shima
2005/0264832 A1 *    12/2005    Baum et al. .................. 358/1.2

FOREIGN PATENT DOCUMENTS

| JP | A 8-234934 | 9/1996 |
| JP | A 9-6558 | 1/1997 |
| JP | A 10-232925 | 9/1998 |
| JP | A 10-326288 | 12/1998 |
| JP | A 11-154070 | 6/1999 |
| JP | A 11-161591 | 6/1999 |
| JP | A 2001-274943 | 10/2001 |

* cited by examiner

Primary Examiner—Douglas Q Tran
(74) Attorney, Agent, or Firm—Oliff & Berridge, PLC (57) ABSTRACT

There is provided an image reading device having an interface to communicate with devices on a network, the image reading device including a data transferring system that communicates with a terminal device on the network according to a certain data transferring protocol, and a reading system that reads an original and generates image data of the original based on information contained in a pathname designated according to the certain data transferring protocol, the pathname being transmitted from the terminal device and being received by the data transferring system.

26 Claims, 9 Drawing Sheets

Scan parameter reference http://<host>:<port>/scanimage/<resolution>/<color mono>/<sheet>/<filename>

| | | |
|---|---|---|
| <resolution> | | 200dpi,300dpi,400dpi |
| <color mono> | | color,mono |
| <sheet> | JPEG,PNG,GIF | 1,ALL |
| | TIFF | 1,2,···,ALL |
| <filetype> | | image.jpg,image.png,image.gif,image.tif | example:
http://10.134.43.14:80/scanimage/400dpi/color/1/image.jpg

FIG. 6

One of requesting Parameters is incorrect

Your Input parameters:
http://10.134.43.14:80/scanimage/500dpi/color/1/image.jpg Underscored parameter should be one of the following.

200dpi
300dpi
400dpi

FIG.9A ftp <host>
>bin
>get /scanimage/<resolution>/<color mono>/<sheet>/
<filename>
>bye

FIG.9B ftp 10.134.43.14
>bin
>get /scanimage/400dpi/color/1/image.jpg
>bye

FIG.9C ftp 10.134.3.14
>bin
>get /scanimage/300dpi/mono/ALL/image.tif
>bye

FIG.10A

```
ftp <host>
>bin
>get /scanparam
>bye
```

FIG.10B

```
ftp 10.134.43.14
>bin
>get /scanparam
>bye
```

FIG.11A

```
ftp <host>
>bin
>get /scancancel
>bye
```

FIG.11B

```
ftp 10.134.43.14
>bin
>get /scancancel
>bye
```

Scan parameter reference ftp <host>
>bin
>get/scanimage/<resolution>/<color mono>/<sheet>/<filename>
>bye

| | | |
|---|---|---|
| <resolution> | | 200dpi,300dpi,400dpi |
| <color mono> | | color,mono |
| <sheet> | JPEG,PNG,GIF | 1,ALL |
| | TIFF | 1,2,···,ALL |
| <filetype> | | image.jpg,image.png,image.gif,image.tif | example:
ftp 10.134.43.14
>bin
>get /scanimage/400dpi/color/1/image.jpg
>bye

FIG.12

'One of requesting Parameter is incorrect

Your Input parameter::
ftp 10.134.43.14:80
>bin
>get /scanimage/500dpi/color/1/image.jpg
>bye Underscore parameter should be one of the following 200dpi
300dpi
400dpi

FIG.13 ftp>get /scanimage/500dpi/color/1/image.jpg<-USER-ENTERED DATA
>200 PORT command successful
>500 /scanimage/500dpi/color/1/image.jpg;No such file or directory◄──── M1

FIG.14

IMAGE READING DEVICE FOR TRANSMITTING IMAGE DATA TO TERMINAL DEVICE

BACKGROUND OF THE INVENTION

The present invention relates to an image reading device which reads an original and generates image data of the original. More specifically, the present invention relates to the image reading device configured to transmit the generated image data to a terminal device through a network.

Generally, image reading devices such as an image scanner are used as peripheral devices of a personal computer. Such an image reading device is generally connected to a host device directly or via a network such as a LAN (Local Area Network). Japanese Provisional Publication No. HEI 11-161592 describes a system in which an image reading device is connected to a personal computer.

To use the conventional image reading device connected to the personal computer, a user is required to install a device driver of the image reading device in the personal computer so as to control the image reading device from the personal computer. Such an installation process of the device driver is troublesome for the user. Further more, certain amounts of hard disk space and memory space are required to install the device driver into the personal computer and to use the device driver.

SUMMARY OF THE INVENTION

The present invention is advantageous in that it provides an image reading device which can eliminate the need for installing a device driver for the image reading device in a terminal device connected to the image reading device via a network.

According to an aspect of the invention, there is provided an image reading device having an interface to communicate with devices on a network. The image reading device includes a data transferring system that communicates with a terminal device on the network according to a certain data transferring protocol, and a reading system that reads an original and generates image data of the original based on information contained in a pathname designated according to the certain data transferring protocol, the pathname being transmitted from the terminal device and being received by the data transferring system.

Since the image reading device generates image data of the originals according to the pathname transmitted from the terminal device, the user is not required to install a device driver of the image reading device into the terminal device to generate image data of the original.

Optionally, the reading system may transmit the image data to the terminal device via the data transferring system. In this case, the user of the terminal device can obtain image data from the image reading device.

In a particular case, the reading system may read the original if the pathname contains a request for image data.

Optionally, the reading system may transmit information concerning a form of the pathname if the pathname contains a request for the form of the pathname.

Further optionally, the reading system may transmit error information to the terminal device if the pathname transmitted from the terminal device is incorrect.

In a particular case, the error information may include information for correcting the incorrect pathname.

Optionally, the information contained in the pathname may include at least one parameter concerning the reading of the original, and the reading system may read the original according to the at least one parameter contained in the pathname.

In a particular case, the at least one parameter may include at least one of a resolution, a number of sheets of originals to be read, designation of color, and an image file format.

In a particular case, the number of sheets of originals to be read can be designated as an indication for reading all of originals provided in the image reading device.

Optionally, the reading system may read the original using default parameters concerning the reading of the original.

Optionally, the reading system may stop the reading if the pathname received by the data transferring system contains a request for cancellation of reading.

In a particular case, the certain data transferring protocol may be a HTTP, and the pathname may be an absolute path designated according to the HTTP.

In a particular case, the absolute path designated according to HTTP may include at lest one of a device name field, a request field for designating a type of a request, a resolution filed, a field for designating a color of read image, a field of a number of sheets of originals to be scanned, and a filename field.

In a particular case, the certain data transferring protocol may be a FTP, and the pathname may be a source pathname designated according to the FTP.

In a particular case, the source pathname designated according to the FTP may include at lest one of a device name field, a request field for designating a type of a request, a resolution filed, a field for designating a color of read image, a field of a number of sheets of originals to be read, and a filename field.

In a particular case, the certain data transferring protocol may be a NetBIOS, and the pathname may be a source pathname designated according to the NetBIOS.

In a particular case, the source pathname designated according to the NetBIOS may include at lest one of a device name field, a request field for designating a type of a request, a resolution filed, a field for designating a color of read image, a field of a number of sheets of originals to be read, and a filename field.

Optionally, the pathname may include a plurality of fields, and positions of the plurality of fields in the pathname may correspond to a plurality of predetermined scan parameters.

According to another aspect of the invention, there is provided an image reading device having an interface to communicate with devices on a network. The image reading device includes a data transferring system that communicates with a terminal device on the network according to a HTTP, and a reading system that reads an original and generates image data of the original based on parameter concerning reading of the original contained in an absolute path designated according to the HTTP, and that transmits the image data to the terminal device via the data transferring system, the absolute path being transmitted from the terminal device and being received by the data transferring system.

Since the image reading device generates image data of the originals according to the pathname transmitted from the terminal device, the user is not required to install a device driver of the image reading device into the terminal device to obtain image data of the original from the image reading device.

According to another aspect of the invention, there is provided an image reading system including a terminal device and an image scanning device which are connected to a network. The terminal device includes a path name designating system that transmits a path name designated according to a certain data transferring protocol to the image scanning device. The image reading device includes a data transferring system that communicates with the terminal device on the network according to the certain data transferring protocol, and a reading system that reads an original and generates image data of the original based on information contained in the path name received by the data transferring system.

Since the image reading device generates image data of the originals according to the pathname transmitted from the terminal device, the user of the terminal device is not required to install a device driver of the image reading device into the terminal device to generate image data of the original.

Optionally, the reading system may transmit the image data scanned to the terminal device via the data transferring system.

In a particular case, the certain data transferring protocol may be a HTTP, and the pathname may be an absolute path designated according to the HTTP.

In a particular case, the certain data transferring protocol may be a FTP, and the pathname may be a source pathname designated according to the FTP.

In a particular case, the certain data transferring protocol may be a NetBIOS, and the pathname may be a source pathname designated according to the NetBIOS.

According to another aspect of the invention, there is provided a computer program to be executed by a computer to achieve a method of reading images. The method includes the steps of: receiving a pathname designated according to a certain data transferring protocol from an external device on a network, and reading an original and generates image data of the original based on information contained in the received pathname.

If the computer program is installed in an image reading device, a user of an terminal device is not required to install a device driver of the image reading device into the terminal device to generate image data of the original.

In a particular case, the method may further include the step of transmitting the generated image data to the terminal device.

DETAILED DESCRIPTION OF THE EMBODIMENTS

Hereafter, embodiments according to the invention are described with reference to the accompanying drawings.

First Embodiment

Figure 1:
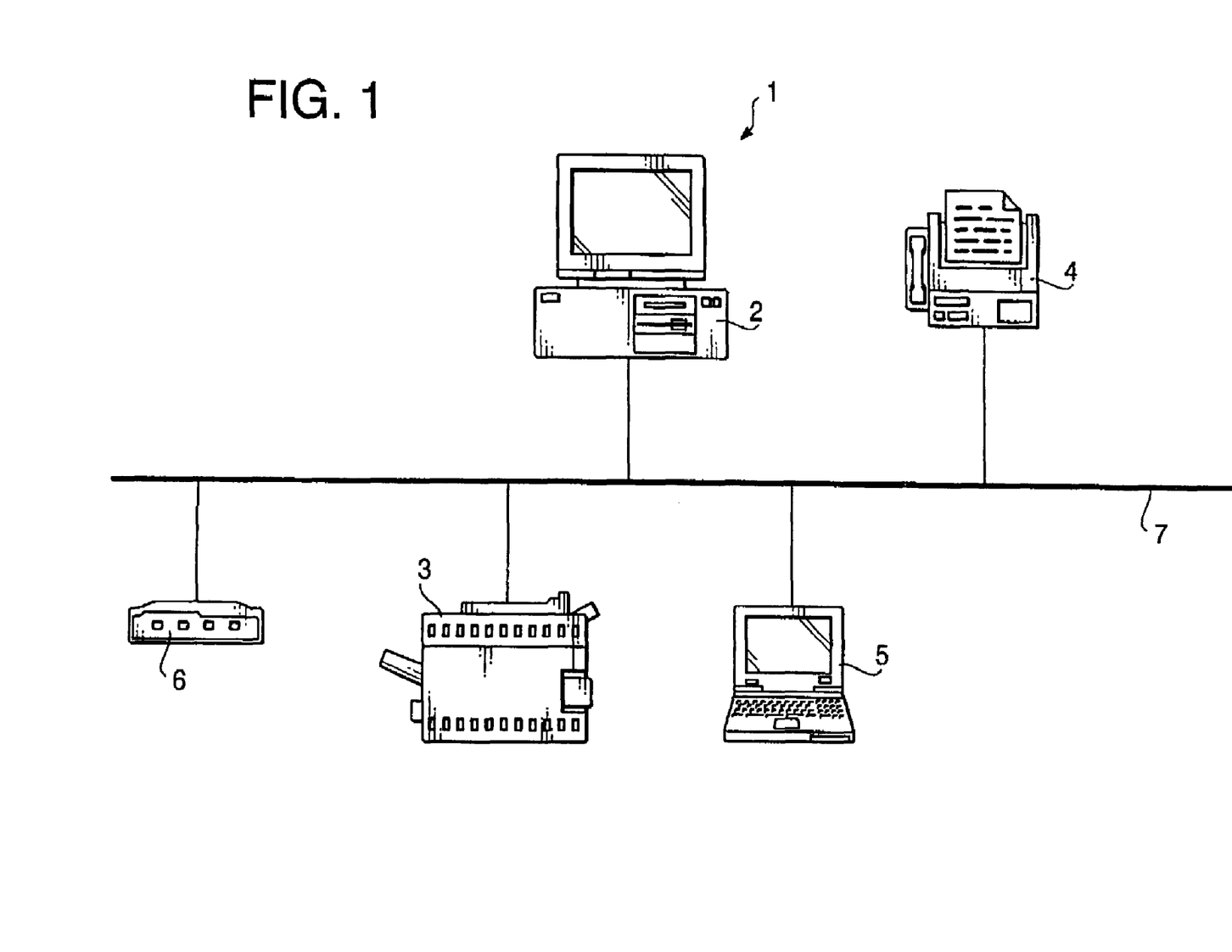
FIG. 1 shows a system configuration of a network system to which embodiments of the present invention can be applied.

FIG. 1 shows a system configuration of a network system 1 to which the embodiments of the present invention can be applied. As shown in FIG. 1, the network system 1 includes a desktop PC (personal computer) 2, an MFP (Multifunction Peripheral) 3 having a function of an image scanner, a facsimile 4, a laptop computer 5, and a router 6, which are connected to each other via a LAN (Local Area Network) 7.

As described in detail below, by transferring a pathname designated according to a certain data transferring protocol such as an HTTP (Hyper Text Transfer Protocol), an FTP (File Transfer Protocol) and a NETBIOS, from the PC 2 to the MFP 3, data generated by the MFP 3 is transferred to the PC 2. It should be noted that, in the first embodiment, the HTTP is used.

Figure 2A:
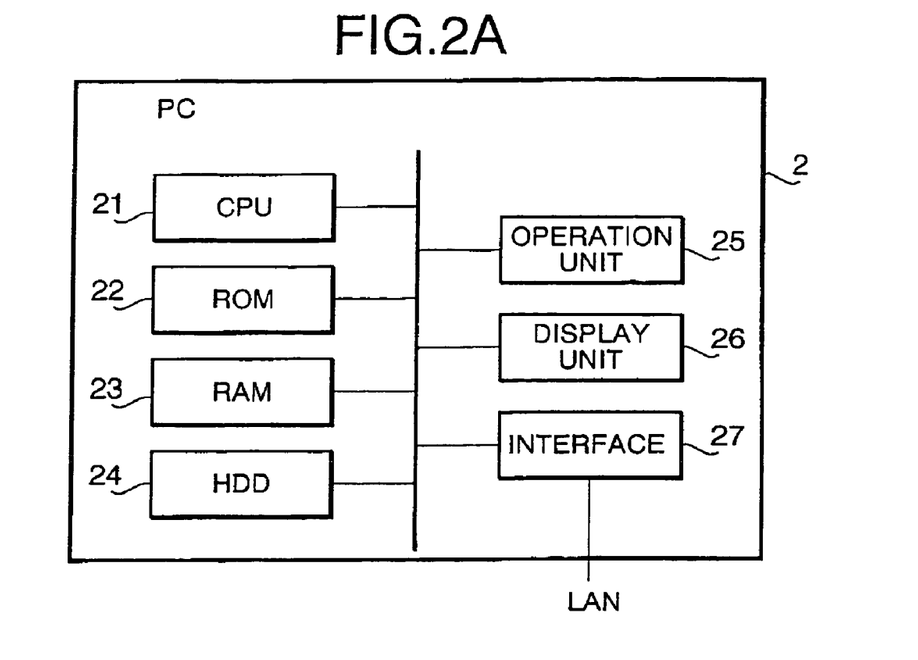
FIG. 2A shows a block diagram of a PC on the network system shown in FIG. 1.
Figure 2B:
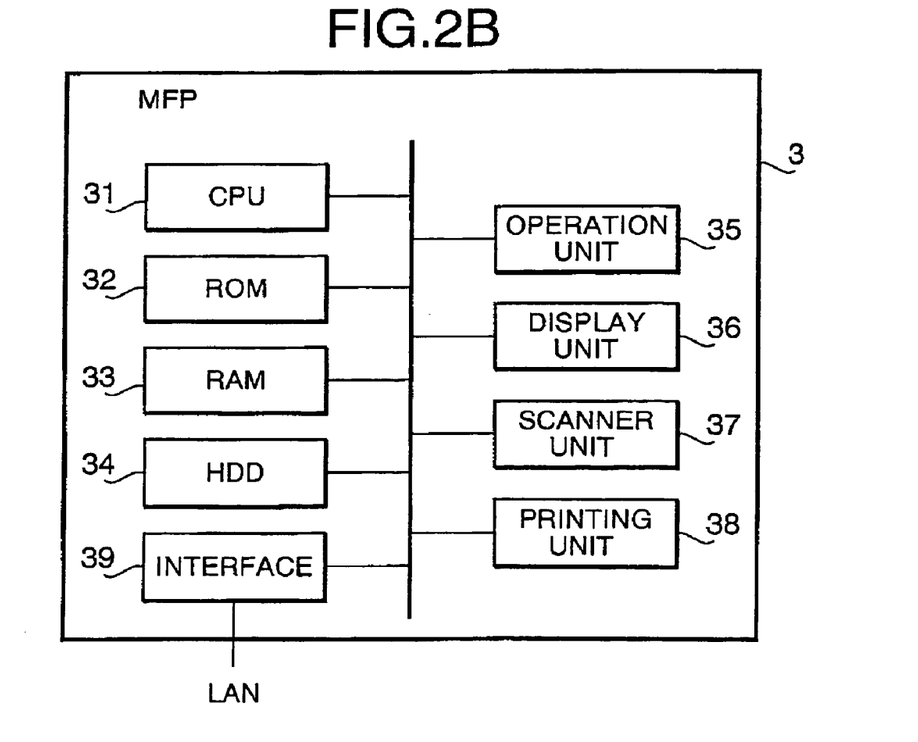
FIG. 2B shows a block diagram of a multifunction peripheral on the network system shown in FIG. 1.

Configurations of the PC 2 and MFP 3 are described with reference to FIG. 2A which is a block diagram of the PC 2, and FIG. 2B which is a block diagram of the MFP 3, respectively. As shown in FIG. 2A, the PC 2 has a CPU 21, a ROM (Read Only Memory) 22, a RAM (Random Access Memory) 23, an HDD (Hard Disk Drive) 24, an operation unit 25, a display unit 26 and an interface 27.

Figure 3:
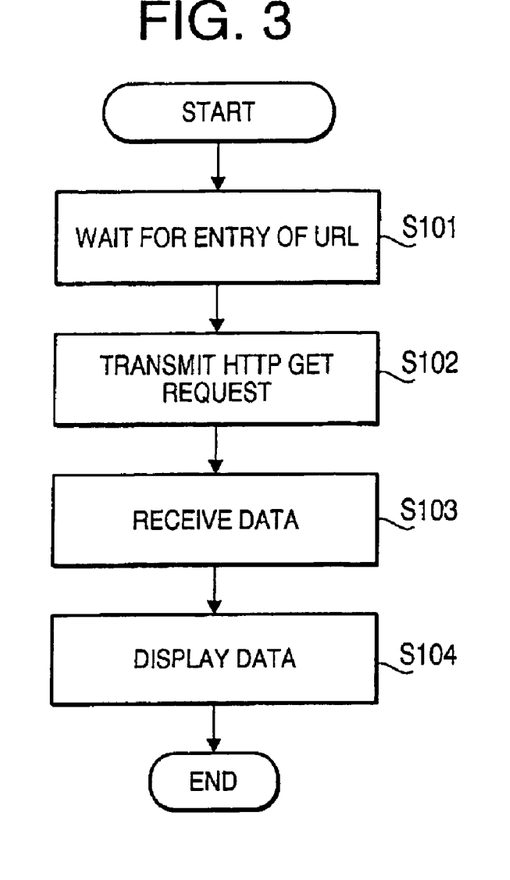
FIG. 3 is a flowchart illustrating an image obtaining process executed by the PC.

The ROM 22 constitutes a part of a main memory of the PC 2. Various programs such as a system program are stored in the ROM 22. The RAM 23 also constitutes a part of the main memory of the PC 2. The RAM 23 has, for example, a work area for storing intermediate results of processes running on the PC 2. In the HDD 24, various application programs including a program of an image obtaining process shown in FIG. 3 are stored.

The operation unit 25 includes a keyboard having a certain number of keys and a mouse (not shown). The display unit 26, on which various types of information are displayed, is connected to the CPU 21. The display unit 26 may be a liquid crystal display. The interface 27 enables the CPU 21 to connect to devices on the LAN 3.

As shown in FIG. 2A, the MFP 3 has a CPU 31, a ROM (Read Only Memory) 32, a RAM (Random Access Memory) 33, an HDD (Hard Disk Drive) 34, an operation unit 35, a display unit 36, a scanner unit 37, a printing unit 38, and an interface 39.

Figure 4:
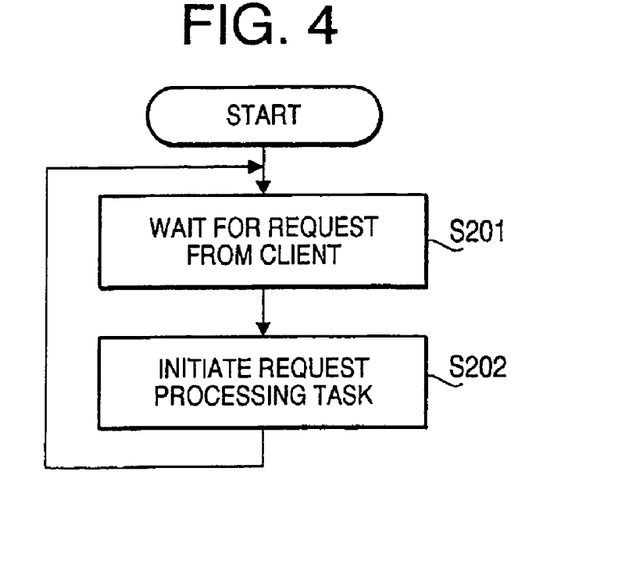
FIG. 4 is a flowchart illustrating an image providing process running on the multifunction peripheral.
Figure 5:
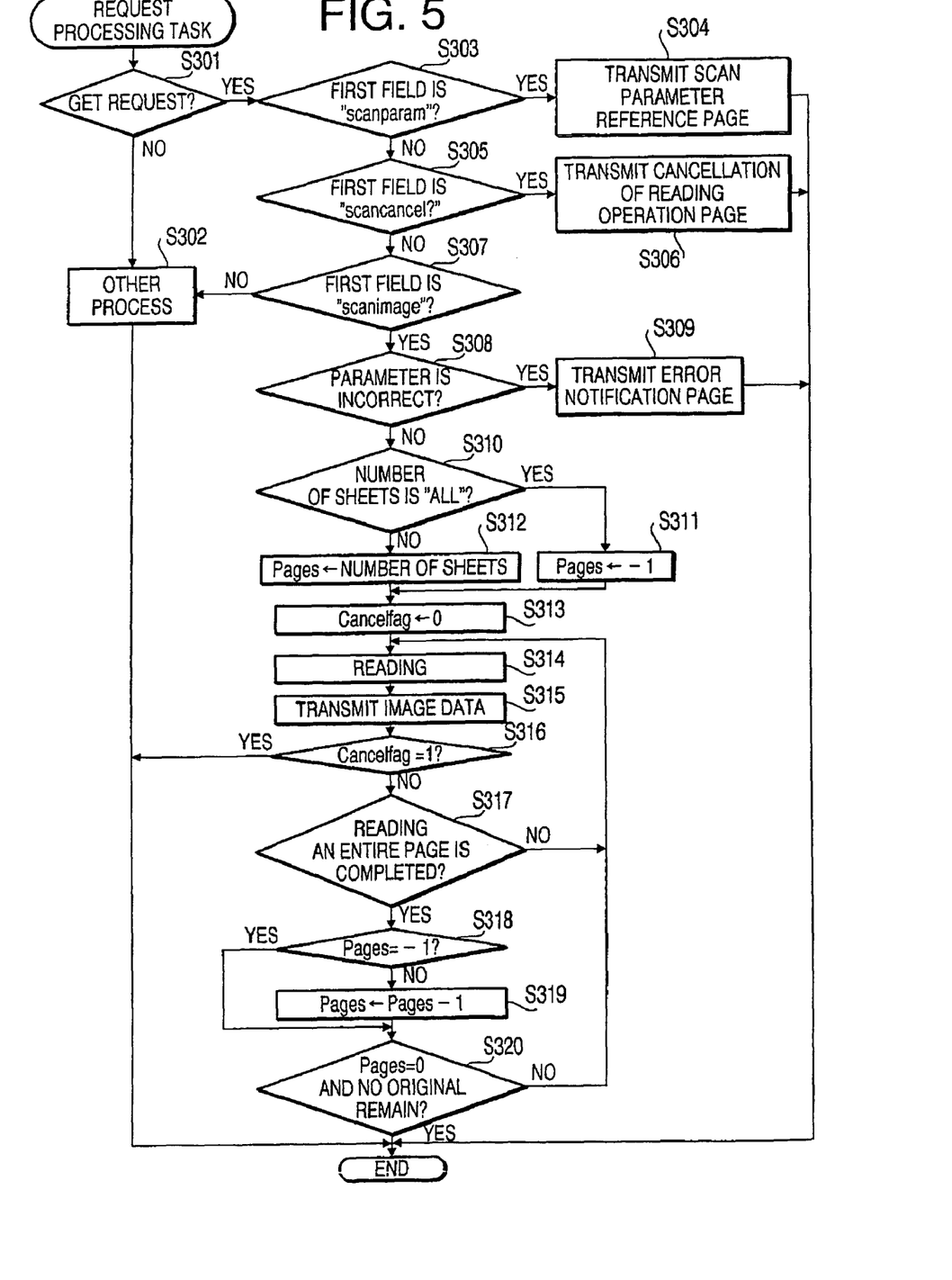
FIG. 5 is a flowchart illustrating a request processing task initiated at step S202 of the image providing process of FIG. 4.

The ROM 32 constitutes a part of a main memory of the MFP 2. Various programs such as a system program of the MFP 3 are stored in the ROM 32. The RAM 33 also constitutes a part of the main memory of the MFP 3. The RAM 33 has a work area for storing intermediate results of processes running on the MFP 3. In the HDD 24, various application programs including a program of an image providing process in FIGS. 4 and 5 are stored.

The operation unit 35 may be a keyboard having a certain number of keys or a touch panel mounted on a display unit 36. The display unit 36, on which various types of information are displayed, is connected to the CPU 31. The display unit 36 may be a liquid crystal display. The interface 39 enables the CPU 31 to connect devices on the LAN 3.

The scanner unit 37 reads originals such as sheets of paper or films to generate image data according to scan parameters set by the CPU 31. The printing unit 38 serves as a printer to print out monochrome or color images.

The user of the PC 2 can obtain image data generated by the MFP 3 via the LAN 3. To make the MFP 3 start reading operation, the user of the PC 2 initiates the image obtaining process shown in FIG. 3 and designates a URL (Uniform Resource Locator) including a pathname called absolute path according to the HTTP. That is, the user inputs the URL indicated below into the PC2.

"http://<host>:<port>/scannername/scanimage/<resolution>/<color mono>/<sheet>/<file>"

In this URL, "/scannername/scanimage/<resolution>/<color mono>/<sheet>/<filename>" is the absolute path.

It is appreciated that, in the absolute path, "scannername" can be omitted because the MFP 3 can operate according to information "/scanimage/<resolution>/<color mono>/<sheet>/<filename>". Therefore, in this embodiment, a form of the URL: "http://<host>:<port>/scanimage/<resolution>/<color mono>/<sheet>/<file>" is used.

The "scanimage" in the absolute path indicates that the absolute path is a request for starting reading operation and for obtaining image data. In a <resolution> field of the absolute path, the user designates a resolution, such as 200 dpi, 300 dpi, or 400 dpi, which the scanner unit 37 of the MFP 3 uses as one of the scan parameters. In a <color mono> field of the pathname, the user types "color" or "mono". When the user types the "color" in the <color mono> field, the scanner unit 37 generates color images of originals. When the user types the "mono" in the <color mono> field, the scanner unit 37 generates monochrome images of originals.

In a <sheet> field, the user designates a number of originals (e.g., 1, 2, . . . , ALL) to be read. If "ALL" is designated, the scanner unit 37 of the MFP 3 reads all of the originals provided therein. In a <filename> field, information concerning a file format which the user requires, such as "image.jpg", "image.png", "image.gif" and "image.tif", which represent JPEG format, PNG format, GIF format and TIFF format, respectively, is typed.

For example, if an IP address of the MFP 3, a port number, a resolution, designation of color, the number of reading, and file format are 10.134.43.14, 80, 400 dpi, color, 1, JPEG, respectively, the URL to be designated is: "http://10.134.43.14:80/scanimage/400 dpi/color/1/image.jpg".

If an IP address of the MFP 3, a port number, a resolution, designation of color, the number of reading, and file format are 10.134.43.14, 80, 400 dpi, mono, ALL, TIFF, respectively, the URL to be designated is: "http://10.134.43.14:80/scanimage/400 dpi/mono/ALL/image.tif ".

If the user want to obtain a scan parameter reference page which include help information concerning designation of the URL, the user can obtain the help information from the MFP 3 by inputting "http://<host>:<port>/scanparam" to the PC 2. The "scanparam" indicates that the absolute path is a request for the scan parameter reference page.

If the user want to make the MFP 3 stop the reading operation, the user types in "http://<host>:<port>/scancancel". The "scancancel" indicates that the absolute path is a request for cancellation of the reading operation.

Figure 6:
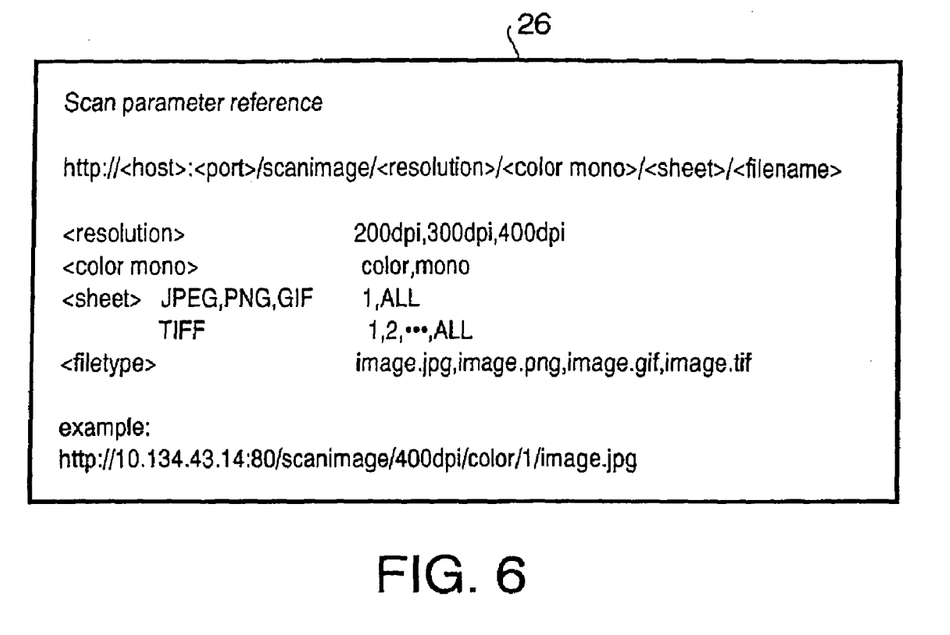
FIG. 6 shows an example of a scan parameter reference page.
Figure 7:
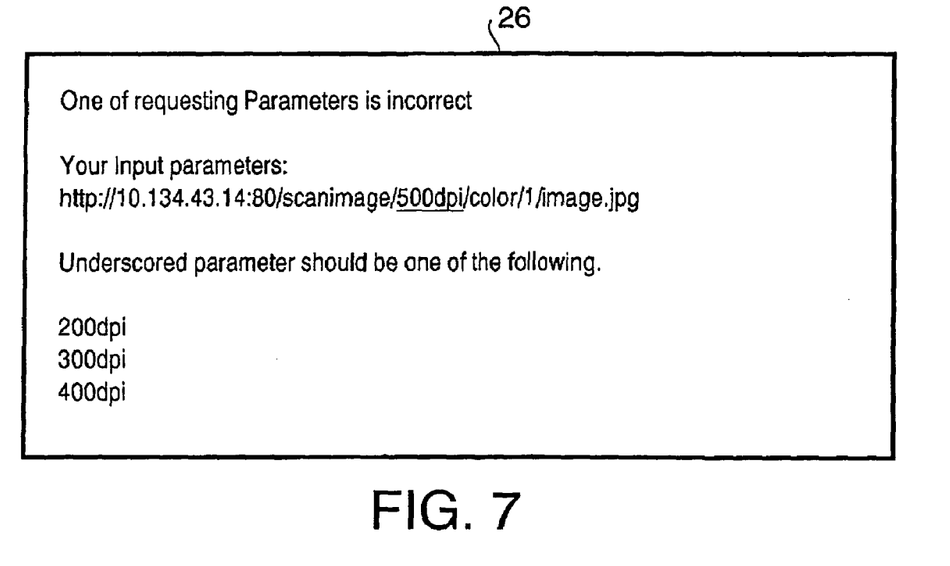
FIG. 7 shows an example of an error notification page.
Figure 8:
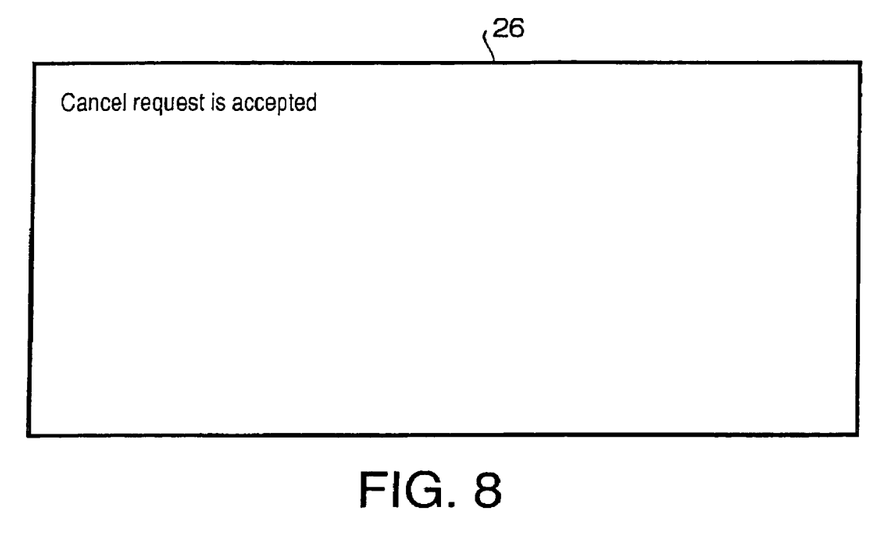
FIG. 8 shows an example of a cancellation notification page.

On the display unit 26 of the PC 2, various information, indicated below, which the MFP 3 replies the requests (i.e., the absolute path) sent from the PC 2 are displayed:

the scan parameter reference page in which the help information concerning designation of scan parameters are indicated (see FIG. 6);

an error notification page in which a message concerning a type miss of the absolute path designated by the user and information for correcting mistyped data (see FIG. 7); and a cancellation notification page in which a message indicating that the MFP 3 has cancelled the reading operation (see FIG. 8).

An example of the scan parameter reference page which the MFP 3 provides for the PC 2 will be described with reference to FIG. 6. As described above, if the user types in "http://<host>:<port>/scanparam", the scan parameter reference page is transmitted from the MFP 3 to the PC 2, and is displayed on the display unit 26 of the PC 2. On the top of the scan parameter reference page a message "Scan parameter reference" which indicates that the page on a screen of the display unit 26 is the scan parameter reference page. Directly below the message "Scan parameter reference", a format of the URL "http://<host>:<port>/scanimage/<resolution>/<color mono>/<sheet>/<filename>" is displayed being followed by scan parameters which can be designated.

As indicated in the scan parameter reference page of FIG. 6, the MFP 3 supports reading resolutions of 200 dpi, 300 dpi and 400 dpi, and color and monochrome reading. Also, it is indicated that, in a <sheet> field, "1" or "ALL" can be designated when the required image format is JPEG, PNG or GIF, and all of "1", "2", . . . , "ALL" can be designated when the required image format is TIFF. Further, in the scan parameter reference page, it is indicated that in a <filename> field the user can designate the image file format inputting one of "image.jpg", "image.png", "image.gif" and "image.tif" into the <filename> field.

At the bottom of the scan parameter reference page, an example of the URL, "http://10.134.43.14:80/scanimage/400 dpi/color/1/image.jpg", is displayed. By referring to the scan parameter reference page, the user can correctly type the absolute path.

An example of the error notification page which the MFP 3 provides for the PC 2 will be described with reference to FIG. 7. As described above, if the user mistypes the absolute path, the error notification page is transmitted from the MFP 3 to the PC 2, and is displayed on the display unit 26.

On the top of the error notification page, a message "One of requesting Parameter is incorrect" which indicates that the number of incorrectly typed scan parameters. Directly below the message, the URL which the user has incorrectly inputted to the PC 2: "http://10.134.43.14:80/scanimage/500 dpi/color/1/image.jpg" is displayed. Underlined fields of the absolute path include incorrect data.

Since the field of the resolution, 500 dpi, is underlined, the user can recognizes that "500 dpi" is incorrect. Further, the error notification page provides correct parameters to be inputted to the field which the user inputted incorrect data, the user can retypes correct scan parameters. As shown in the error notification page of FIG. 7, three correct parameters of 200 dpi, 300 dpi and 400 dpi are indicated under a message "Underscore parameter should be one of the following,".

An example of the cancellation notification page which the MFP 3 provides will be described with reference to FIG. 8. As shown in FIG. 8, a message "Cancel request is accepted" which indicates that the MFP 3 stops the reading operation according the request sent from the PC 2. The user can recognizes that the MFP 3 has accepted the request for the cancellation of the reading operation.

FIG. 3 is a flowchart illustrating the image obtaining process running on the PC2. FIG. 4 is a flowchart illustrating the image providing process running on the MFP 3, and FIG. 5 is a flowchart illustrating a request processing task initiated at step S202 of the image providing process of FIG. 4. It should be noted that the process shown in FIG. 3 is executed under control of the CPU 21 of the PC 2, and the processes shown in FIGS. 4 and 5 are executed under control of the CPU 31 of the MFP 3.

As shown in FIG. 3, initially, the CPU 21 of the PC 2 waits until the URL is inputted by the user through the operation unit 25 (S101). When the URL is inputted by the user, the CPU 21 transmits a GET-REQUEST containing the absolute path designated by the user to a device on the LAN 3. Assume that the device to which the GET-REQUEST is transmitted is the MFP 3.

In step S103, the CPU 21 receives a response to the GET-REQUEST from the MFP 3. Then, in step S104, the CPU 21 displays information contained in the response from the MFP 3 on the display unit 26.

The process shown in FIG. 3 will be described more specifically. When the user types in the URL requesting for image data (S101), the CPU 21 transmits the GET-REQUEST requesting the MFP 3 to start the reading operation and to send the image data via the LAN 3 (S102). If the absolute path typed by the user is correct, the PC 2 can receives the image data generated by the MFP 3, and displays the image data on the display unit 26 (S103,S104).

If the absolute path typed by the user is incorrect, the PC 2 receives data of the error notification page (FIG. 7) and displays the error notification page on the display unit 26 (S103, S104).

If the user types in the absolute path requesting the scan parameter reference page, the CPU 21 transmits the GET-REQUEST requesting the MFP 3 to transmit the scan parameter reference page (S101, S102). Then, the CPU 21 of the PC 2 receives data of the scan parameter reference page and displays the scan parameter reference page (S103, S104).

If the user types in the absolute path requesting the cancellation of the scanning operation, the CPU 21 of the PC 2 transmits the GET-REQUEST requesting the MFP 3 to stop the reading operation (S101, S102). Then, the CPU 21 of the PC 2 receives data of the cancellation notification page (FIG. 8) and displays the cancellation notification page (S103, S104).

As shown in FIG. 4, in step S201, the CPU 31 of the MFP 3 waits for the request from a client device on the LAN 3. Assume that the client device is the PC2. If the CPU 31 receives the request from the PC 2, the CPU 31 initiates the request processing task at step S202. Then, the CPU 31 waits again for a request from a client device.

In step S301 of the request processing task shown in FIG. 5, the CPU 31 determines whether the request received in step S201 of FIG. 4 is the GET-REQUEST. When the request from the PC 2 is not the GET-REQUEST (S301: NO), the CPU 31 executes a process according to the request received from the PC 2 (S302). Then, the request processing task terminates.

When the request from the PC 2 is the GET-REQUEST (S301:YES), the CPU 31 determines whether a first field of the absolute path of the URL is "scanparam". That is, the CPU 31 determines whether the absolute path contained in the GET-REQUEST is the request for the scan parameter reference page.

When the CPU 31 determines that the absolute path contained in the GET-REQUEST is the request for the scan parameter reference page (S303:YES), the CPU 31 transmits data of the scan parameter reference page to the PC 2 via the interface 39 (S304). Then, the request processing task terminates. When the CPU 31 determines that the absolute path contained in the GET-REQUEST in not the request for the scan parameter reference path (S303: NO), control proceeds to step S305.

In step S305, the CPU 31 determines whether a first field of the absolute path of the URL is "scancancel". That is, the CPU 31 determines whether the absolute path contained in the GET-REQUEST is the request for the cancellation of the scanning operation.

When the CPU 31 determines that the first field of the absolute path is "scancancel" (S305:YES), control proceeds to step S306. When the CPU 31 determines that the second field of the absolute path is not "scancancel" (S305:NO), control proceeds to step S307.

In step S306, the CPU 31 assigns a value of 1 to a flag Cancelfag which is used as a global variable, and transmits data of the cancellation notification page to the PC 2. As described later, if the Cancelfag is switched to 1 by the request processing task for the cancellation of the scanning process, another request processing task, which has already been initiated by a request for the image data from the PC 2, is terminated at step S316.

In step S307, the CPU 31 determines whether the first field of the absolute path is "scanimage". That is, the CPU 31 determines whether the absolute path contained in the GET-REQUEST is the request for the image data.

When the CPU 31 determines that the first field of the absolute path is not "scanimage" (S307:NO), control proceeds to step S302 where CPU 31 executes another task according to the GET-REQUEST from the PC2. When the CPU 31 determines that the first field of the absolute path is "scanimage" (S307:YES), control proceeds to step S308.

In step S308, the CPU 31 checks whether the scan parameters contained in the absolute path transmitted form the PC 2 are correct. When the CPU 31 determines that the absolute path has an incorrect scan parameter (S308:YES), the CPU 31 generates data of the error notification page and transmits it to the PC 2 (S309). When the CPU 31 determines that none of the scan parameters in the absolute path is incorrect (S308: NO), control proceeds to step S310.

In step S310, the CPU 31 determines whether the number typed in the <sheet> field of the absolute path is "ALL". When the <sheet> field is "ALL" (S310:YES), the CPU 31 assigns −1 to a variable Pages (S311). When the <sheet> field is not "ALL" (S310:NO), the CPU 31 assigns the number in the <sheet field> to the Pages (S312).

Next, the CPU 31 assigns 0 to the flag Cancelfag (S313). In step S314, the CPU 31 makes the scanner unit 37 start reading operation and generates image data according to the scan parameters contained in the absolute path from the PC 2. Then, the CPU 31 transmits image data to the PC 2 (S315).

In step S316, the CPU 31 determines whether the flag Cancelfag is 1. When the flag Cancelfag is 1 (S316:YES), the request processing task terminates. When the flag Cancelfag is not 1 (S316:NO), control proceeds to step S317.

In step S317, the CPU 31 determines whether reading operation of an entire page of an original is completed. When the CPU 31 determines that the reading operation of the entire page of the original is not completed (S317:NO), control returns to step S314 to continue the reading operation. When the CPU 31 determines that the reading operation of the entire page of the original is completed (S317:YES), control proceeds to step S318.

In step S318, the CPU 31 determines whether the variable Pages is −1. When the variable Pages is −1 (S318:YES), i.e., when the <sheet> field of the absolute path is "ALL", control proceeds to step S320. When the <sheet> field is not "ALL" (S318:NO), the CPU 31 decrements the variable Pages (S319). It is appreciated that the value of the variable Pages indicates remaining sheets of the originals to be read.

In step S320, the CPU 31 determines whether the variable Pages is zero, and determines whether the originals to be read remain. When the variable Pages is zero and no originals remain (S320:YES), the request processing task terminates.

When the variable Pages is not zero or the originals to be read remain (S320:NO), control returns to S314 to read remaining originals.

More specifically, when the PC 2 transmits a correct absolute path requesting for image data, the request processing task (FIG. 5) is initiated, and then the CPU 31 of the MFP 3 determines that the first filed of the absolute path is "scanimage" (S307: YES). The CPU 31 also determines that no error is included in the absolute path (S308:NO).

Further, the CPU 31 of the MFP 3 starts the reading operation according to the scan parameters contained in the absolute path and transmits the image data to the PC 2 (S314-S320).

If the CPU 31 of the MFP 3 receives an absolute path requesting for the cancellation of the reading operation from the PC 2 while the CPU 31 executes reading operation initiated by another request, the CPU 31 initiates a request processing task for the cancellation of the reading operation. In this case, the CPU 31 determines that the first field of the absolute path is "scancancel" (S301:YES), and assigns 1 to the flag Cancelfag. Next, the CPU 31 transmits data of the cancellation notification page to the PC 2(S306). Then, the request processing task for the cancellation of the scanning process terminates.

Since the flag Cancelfag is assigned 1 by the request processing task for the cancellation of the reading process, in step S316 of the request processing task for the reading operation, the CPU 31 determines that the flag Cancelfag is 1. Then, the processing task for the reading operation terminates (i.e., the reading operation is stopped).

When the PC 2 transmits an absolute path requesting for image data including an incorrect scan parameter, if the absolute path has an incorrect scan parameter, in step S308, the CPU 31 determines that the absolute path transmitted from the PC 2 includes an incorrect scan parameter (S308:YES). Then, the CPU 31 generates data of the error notification page, and transmits it to the PC 2 (S309).

If the PC 2 transmits an absolute path requesting for the reference notification page to the MFP 3, the CPU 31 initiates a request processing task for the reference notification page. In this case, the CPU 31 determines that the first field of the absolute path transmitted from the PC 2 is "scanparam" (S303:YES). Then, the CPU 31 transmits data of the reference notification page to the PC 2 (S304).

As described above, according to the first embodiment of the present invention, the user can obtain image data by simply inputting the URL to the PC 2. It is appreciated that the user is not required to install a device driver into the PC 2 to obtain image data from the MFP 3.

Even if the user does not know how to designate the scan parameters, the user can obtain the reference notification page.

If the absolute path designated by the user has incorrect data, the user can obtain the error notification page including correct information to be retyped. Therefore, the user can promptly recognize that the user has designated incorrect scan parameters, and can retype the correct data referring to the error notification page.

Since the absolute path includes the <sheet> field, the user can obtain a plurality of pieces of image data of the plurality of originals in one operation. Further, the user can make the MFP 3 stop the reading operation by simply inputting the URL to the PC 2.

since, communications between the PC 2 and the MFP 3 are performed according to HTTP, the MFP 3 may be connected to another network outside the router 6.

Second Embodiment

A second embodiment of the present invention will be described. The feature of the second embodiment is that communications between the PC 2 and MFP 3 are performed according to FTP. The system configurations of the second embodiment are the same as those of the first embodiment shown in FIGS. 1 and 2. Also, the processes for transmitting the image data from an image reading device to a terminal device are substantially same as those of the first embodiment shown in FIGS. 3-5. Therefore, detailed explanations of the system configurations and the processes which are the same as those of the first embodiment will not be repeated.

FIGS. 9A-11B show examples of text-input screens on which the user designates a pathname according to the FTP through the use of operation nit 25.

Figure 9A:
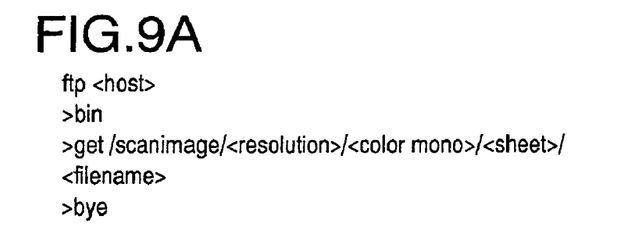
FIG. 9A shows a format a source pathname requesting for image data designated according to a FTP.

To make the MFP 3 start the reading operation, the user initiates an ftp application program by typing in "ftp <host>" and types in a get command with the pathname called a source pathname (FIG. 9A).

get /scannername/scanimage/<rsolution>/<color mono>/<sheet>/<filename>

It is appreciated that, in the source pathname, "scannername" can be omitted because the MFP 3 can operate according to information I/scanimage/<resolution>/<color mono>/<sheet>/<filename>,. Therefore, in this embodiment, a form : get /scanimage/<rsolution>/<color mono>/<sheet>/<filename> is used.

The "scanimage" in the source patimame indicates that the source pathname is a request for image data. In a <resolution> field of the source pathname, the user designates a resolution, such as 200 dpi, 300 dpi, or 400 dpi. In a <color mono> field of the source pathname, the user designates "color" or "mono". When the user designates "color" in the <color mono> field, the scanner unit 37 generates color images. When the user designates "mono" in the <color mono> field, the scanner unit 37 generates monochrome images.

Figure 9B:
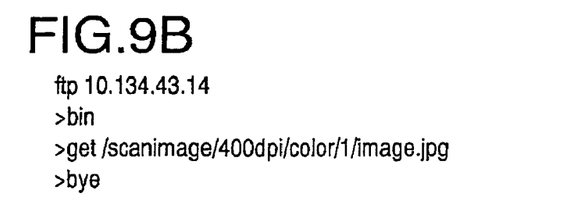
FIG. 9B shows an example of the source pathname requesting for image data.
Figure 9C:
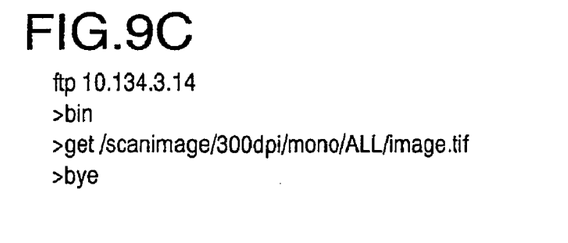
FIG. 9C shows other example of the source pathname requesting for image data.

FIG. 9B shows a case where the IP address of the MFP 3 is 10.134.43.14, the resolution is 400 dpi, designation of color is "color", the number of sheets of originals to be read is "1", and a file format is JPEG. FIG. 9C shows a case where the IP address of the MFP 3 is 10.134.43.14, the resolution is 300 dpi, designation of color is "mono", the number of sheets of originals to be read is "ALL", and a file format is TIFF.

Figure 10A:
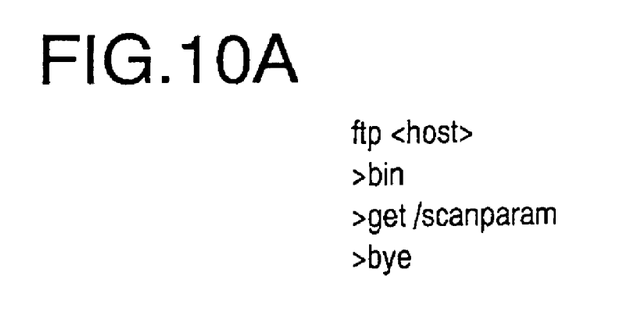
FIG. 10A shows a format of the source pathname requesting for the scan parameter reference page.
Figure 10B:
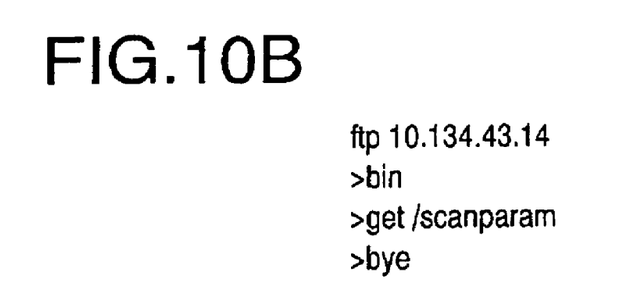
FIG. 10B shows an example the source pathname requesting for the scan parameter reference page.

FIG. 10A shows a case where the user types in a get command with the source pathname requesting a scan parameter reference page. In the source pathname shown in FIG. 10A, "scanparam" indicates that the source pathname is a request for the scan parameter reference page. FIG. 10B shows an example where the user sends the request for the scan parameter reference page to the MFP 3 whose IP address is 10.134.43.14.

Figure 11A:
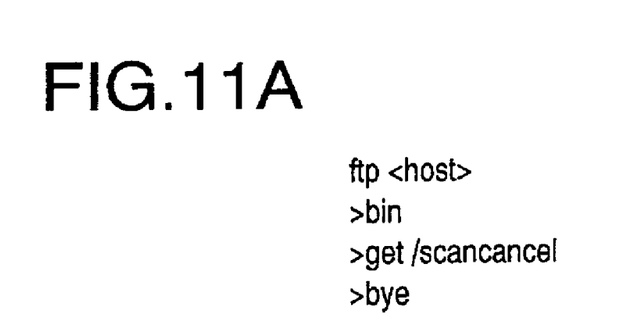
FIG. 11A shows a format of the source pathname requesting for the cancellation of reading operation.
Figure 11B:
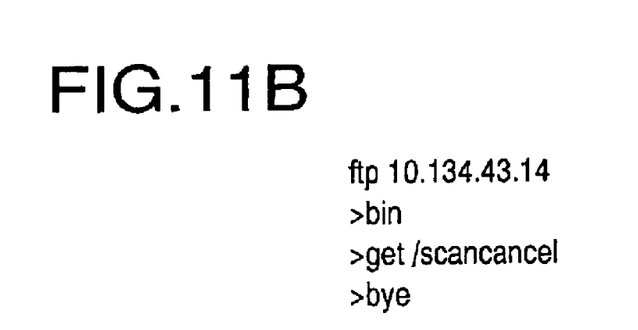
FIG. 11B shows an example of the source pathname requesting for the cancellation of reading operation.

FIG. 11A shows a case where the user types in a get command with the source pathname requesting a cancellation of the reading operation. In the source pathname shown in FIG. 11A, "scancancel" indicates that the source pathname is a request for the cancellation of the scanning operation. FIG. 11B shows an example where the user sends the request for the cancellation of the scanning operation to the MFP 3 whose IP address is 10.134.43.14.

Figure 12:
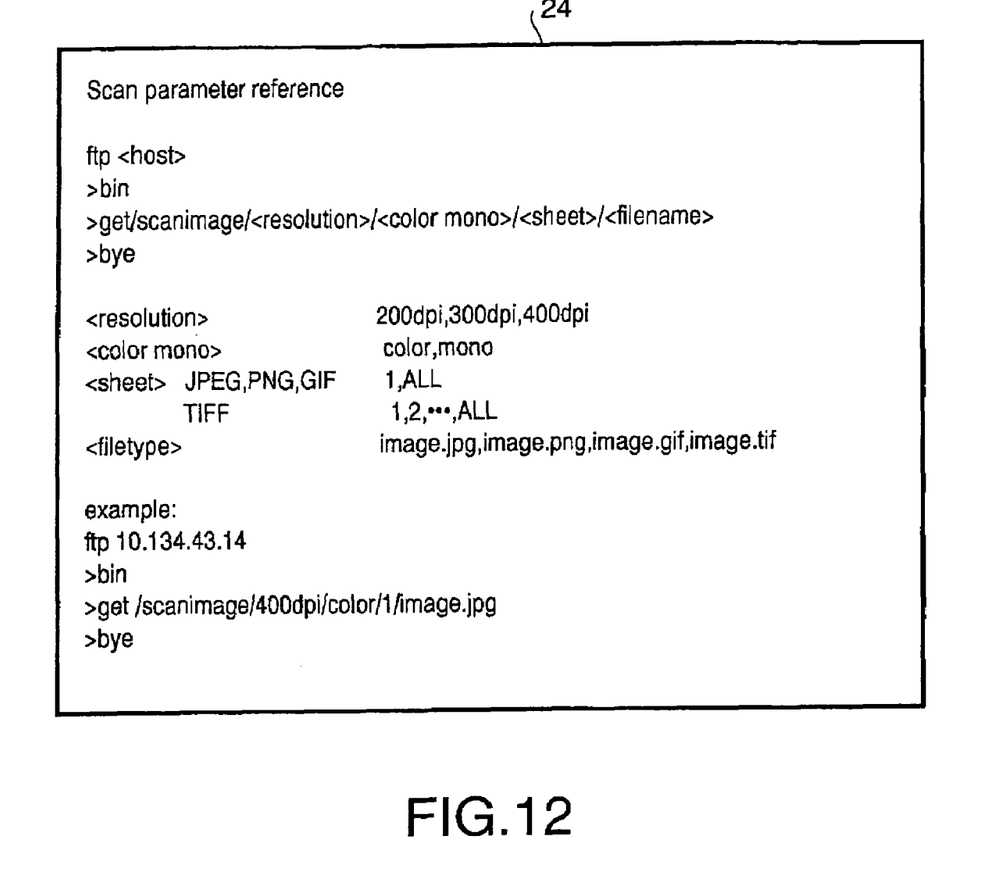
FIG. 12 shows an example of the scan parameter reference page.

FIG. 12 shows an example of the scan parameter reference page transmitted from the MFP 3 to the PC 2. Similarly to the scan parameter reference page shown in FIG. 6 of the first embodiment, below a message "Scan parameter reference", various scan parameters which the MFP 3 supports and an example of data entry is displayed.

The scan parameter reference page shown in FIG. 12 may be stored in the HDD 34 as a file such as a text file. In this case, the PC 2 can displays the scan parameter reference page without connecting the PC 2 to the MFP 3 by reading the file of the scan parameter reference page.

Figure 13:
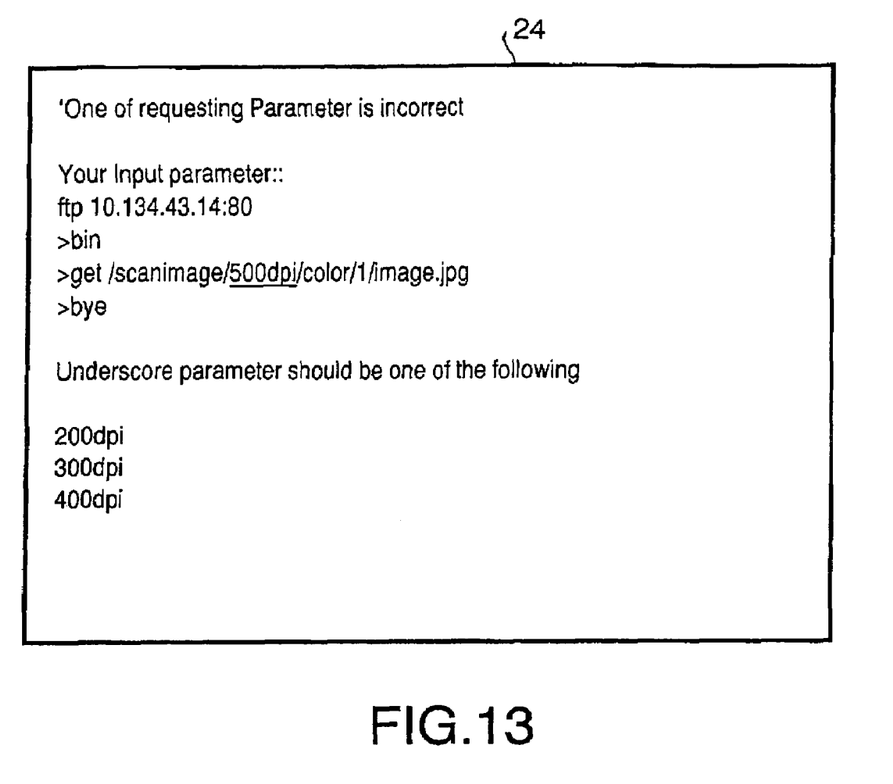
FIG. 13 shows an example of an error notification page.

If the source pathname designated by the user is incorrect, the MFP 3 transmits an error notification page shown in FIG. 13. Similarly to the page shown in FIG. 7, as shown in FIG. 13, below a message "One of requesting Parameter is incorrect", scan parameters which the user has inputted and correct scan parameters are displayed.

The error notification page shown in FIG. 13 may be stored in the HDD 34 as a file such as a text file. In this case, the PC 2 can read out and displays the error notification page.

Next, processes for transmitting image data from the MFP 3 to the PC 2 will be described more specifically with reference to flowcharts of FIGS. 3-5.

If the user types in the get command with the source pathname requesting for the scan parameter reference page, the CPU 21 of the PC 2 transmits an FTP GET request to the MFP 3. When the MFP 3 receives the FTP GET request, a request processing task for the scan parameter reference page is initiated (S201, S202). In this case, the CPU 31 of the MFP 3 determines that received data is the FTP GET request (S301: YES) and that a first field of the source pathname is "scanparam" (S303:YES). Then, the scan parameter reference page is transmitted from the MFP 3 to the PC 2 (S304). The scan parameter reference page is displayed on the display unit 26 of the PC 2 and is stored in the HDD 24.

If the user correctly designates a get command with a source pathname requesting for image data, the CPU 21 of the PC 2 transmits a FTP GET request to the MFP 3, and then the CPU 31 of the MFP 3 initiates a request processing task for the image data (S201,S202). In this case, the CPU 31 of the MFP 3 determines that received data is the FTP GET request (S301:YES) and that a first field of the source pathname is "scanimage" (S303:YES). Then, the CPU 31 of the MFP 3 determines that scan parameters in the source pathname are correct (S308:NO).

Next, the MFP 3 performs the scanning operation according to the scan parameters in the source pathname and transmits the image data to the PC 2 (S310-S320). After the PC 2 receives the image data from the MFP 3, the PC 2 displays the image data on the display unit 26 and stores the image data in the HDD 24.

If the PC 2 types in a get command with a source pathname requesting a cancellation of the reading operation while the MFP 3 performs the reading operation, the CPU 31 of the MFP 3 receives the get command and initiates a request processing task for the cancellation of the scanning operation (S201,S202).

In this case, the CPU 31 of the MFP 3 determines that received data is the FTP GET request (S301:YES) and that a first field of the source pathname is "scancancel" (S303: YES). Then, the CPU 31 of the MFP 3 assigns 1 to the flag Cancelfag to terminate the request processing task for the scanning operation, and transmits data of the cancellation notification page to the PC 2.

After reception of the data of the cancellation notification page, the PC 2 displays the cancellation notification page on the display unit 26 and stores the cancellation notification page in the HDD 24.

If the user types in a get command with an incorrect source pathname, the PC 2 transmits a FTP GET request with the incorrect source pathname to the MFP 3. When the MFP 3 receives the FTP GET request, a request processing task for the image data is initiated (S201,S202). In this case, the CPU 31 of the MFP 3 determines that received data is the FTP GET request (S301:YES) and that a first field of the source pathname is "scanimage" (S303:YES). Then, the CPU 31 of the MFP 3 determines that the source pathname includes an incorrect scan parameter (S308:YES).

Figure 14:
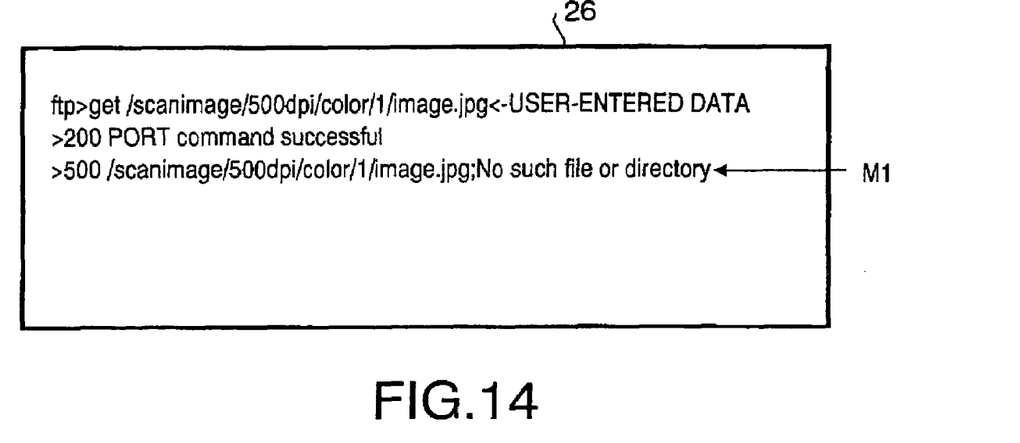
FIG. 14 shows an example of an error message which the image reading device transmits to the PC.

Next, the CPU 31 transmits data of the error notification page shown in FIG. 13 to the PC 2. The CPU 31 may also reply an error message M1 shown in FIG. 14 to the PC 2. FIG. 14 shows a case where the ftp application program running on the PC 2 is a default ftp client of Window XP®.

After reception of the data of the error notification page, the CPU 21 of PC 2 displays the error notification page on the display unit 26 and stores the error notification page into the HDD 24.

Although the present invention has been described in considerable detail with reference to certain preferred embodiments thereof, other embodiments are possible.

For example, the described embodiments employ the HTTP and the FTP for communications between a terminal device and an image reading device on a network, other protocols such as a NetBIOS may be alternatively employed without departing from the spirit or scope of the invention. If the NetBIOS is employed, a following pathname called a source pathname is typed in along with a copy command. "copy \\scannername\scanimage\400 dpi\color\1\image.jpg"

A first field of the above source pathname of the copy command is a device name. A second filed of the source pathname is an instruction (i.e., "scanimage", "scanparam" or "scancancel"). A third, fourth, fifth fields of the source pathname are a resolution, designation of color and the number of sheets of originals to be read, respectively. The last field of the source pathname is a filename.

Although, in the described embodiments, scan parameters contained in the pathname are the resolution, the designation of color, the number of original to be read, and the filename, other scan parameters may employed. Alternatively, the image reading devise may use default scan parameters to shorten the pathname which the user should designate. The order of the scan parameters arranged in the pathname may be changed.

The image scanning device may support various image file formats other than JPEG, PNG, GIF and TIFF.

The device and method according to the present invention can be realized when appropriate programs are provided and executed by a computer. Such programs may be stored in recording medium such as a flexible disk, CD-ROM, memory cards and the like and distributed. Alternatively or optionally, such programs can be distributed through networks such as the Internet.

The present disclosure relates to the subject matter contained in Japanese Patent Application No. 2002-278925, filed on Sep. 25, 2002, which is expressly incorporated herein by reference in its entirety.

What is claimed is:

1. An image reading device having an interface to communicate with devices on a network, comprising:
a data transferring system that communicates with a terminal device on the network according to a certain data transferring protocol; and
a reading system that reads an original and generates image data of the original based on information contained in a pathname designated according to the certain data transferring protocol, the pathname being transmitted from the terminal device and being received by said data transferring system,
wherein the information contained in the pathname includes first information representing a file format of a plurality of file formats in which the image data is to be generated and second information representing a number of sheets of the original to be read, wherein the number of sheets of the original to be read can be set for each of the plurality of file formats.

2. The image reading device according to claim 1, wherein said reading system transmits the image data to the terminal device via said data transferring system.

3. The image reading device according to claim 1, wherein said reading system reads the original if the pathname contains a request for image data.

4. The image reading device according to claim 1, wherein said reading system transmits information concerning a form of the pathname if the pathname contains a request for the form of the pathname.

5. The image reading device according to claim 1, wherein said reading system transmits error information to the terminal device if the pathname transmitted from the terminal device is incorrect.

6. The image reading device according to claim 5, wherein the error information includes information for correcting the incorrect pathname.

7. The image reading device according to claim 1,
wherein the information contained in the pathname includes at least one parameter concerning the reading of the original,
wherein said reading system reads the original according to the at least one parameter contained in the pathname.

8. The image reading device according to claim 7, wherein the at least one parameter includes at least one of a resolution, a number of sheets of originals to be read, designation of color, and an image file format.

9. The image reading device according to claim 8, wherein the number of sheets of originals to be read can be designated as an indication for reading all of originals provided in said image reading device.

10. The image reading device according to claim 1, wherein said reading system reads the original using default parameters concerning the reading of the original.

11. The image reading device according to claim 1, wherein said reading system stops the reading if the pathname received by said data transferring system contains a request for cancellation of reading.

12. The image reading device according to claim 1,
wherein the certain data transferring protocol is a HTTP,
wherein the pathname is an absolute path designated according to the HTTP.

13. The image reading device according to claim 12,
wherein the absolute path designated according to HTTP includes at least one of a device name field, a request field for designating a type of a request, a resolution field, a field for designating a color of read image, a field of a number of sheets of originals to be scanned, and a filename field.

14. The image reading device according to claim 1,
wherein the certain data transferring protocol is a FTP,
wherein the pathname is a source pathname designated according to the FTP.

15. The image reading device according to claim 14,
wherein the source pathname designated according to the FTP includes at least one of a device name field, a request field for designating a type of a request, a resolution field, a field for designating a color of read image, a field of a number of sheets of originals to be read, and a filename field.

16. The image reading device according to claim 1,
wherein the certain data transferring protocol is a NetBIOS,
wherein the pathname is a source pathname designated according to the NetBIOS.

17. The image reading device according to claim 16,
wherein the source pathname designated according to the NetBIOS includes at least one of a device name field, a request field for designating a type of a request, a resolution field, a field for designating a color of read image, a field of a number of sheets of originals to be read, and a filename field.

18. The image reading device according to claim 1,
wherein the pathname includes a plurality of fields,
wherein positions of the plurality of fields in the pathname correspond to a plurality of predetermined scan parameters.

19. An image reading device having an interface to communicate with devices on a network, comprising:
a data transferring system that communicates with a terminal device on the network according to a HTTP; and
a reading system that reads an original and generates image data of the original based on parameters concerning reading of the original contained in an absolute path designated according to the HTTP, and that transmits the image data to the terminal device via the data transferring system, the absolute path being transmitted from the terminal device and being received by said data transferring system,
wherein the parameters contained in the absolute path includes first information representing a file format of a plurality of file formats in which the image data is to be generated and second information representing a number of sheets of the original to be read, wherein the number of sheets of the original to be read can be set for each of the plurality of file formats.

20. An image reading system including a terminal device and an image scanning device which are connected to a network,
said terminal device comprising:
a pathname designating system that transmits a pathname designated according to a certain data transferring protocol to said image scanning device,
said image reading device comprising:
a data transferring system that communicates with the terminal device on the network according to the certain data transferring protocol; and
a reading system that reads an original and generates image data of the original based on information contained in the pathname received by said data transferring system,
wherein the information contained in the pathname includes first information representing a file format of a plurality of file formats in which the image data is to be generated and second information representing a number of sheets of the original to be read, wherein the number of sheets of the original to be read can be set for each of the plurality of file formats.

21. The image reading system according to claim 20, wherein said reading system transmits the image data scanned to the terminal device via said data transferring system.

22. The image reading system according to claim 20, wherein the certain data transferring protocol is a HTTP, wherein the pathname is an absolute path designated according to the HTTP.

23. The image reading system according to claim 20, wherein the certain data transferring protocol is a FTP, wherein the pathname is a source pathname designated according to the FTP.

24. The image reading system according to claim 20, wherein the certain data transferring protocol is a NetBIOS, wherein the pathname is a source pathname designated according to the NetBIOS.

25. A computer program stored in a computer readable medium to be executed by a computer to achieve a method of reading images, the method comprising the steps of:
receiving a pathname designated according to a certain data transferring protocol from an external device on a network; and
reading an original and generating image data of the original based on information contained in the received pathname,
wherein the information contained in the received pathname includes first information representing a file format of a plurality of file formats in which the image data is to be generated and second information representing a number of sheets of the original to be read, wherein the number of sheets of the original to be read can be set for each of the plurality of file formats.

26. The computer program according to claim 25, wherein the method further comprising the step of transmitting the generated image data to the terminal device.

* * * * *